United States Patent
Gerber et al.

(10) Patent No.: US 6,398,555 B1
(45) Date of Patent: Jun. 4, 2002

(54) SIMULATION SYSTEM

(75) Inventors: Peter Gerber, Berikon; Fabian Ochsner, Nussbaumen, both of (CH)

(73) Assignee: Oerlikon Contraves AG, Zurich (CH)

( * ) Notice: Subject to any disclaimer, the term of this patent is extended or adjusted under 35 U.S.C. 154(b) by 0 days.

(21) Appl. No.: 09/595,510

(22) Filed: Jun. 14, 2000

(30) Foreign Application Priority Data

May 12, 2000 (CH) .............................................. 0944/00

(51) Int. Cl.[7] .................................................. F41G 3/02
(52) U.S. Cl. ...................................... 434/22; 434/307 R
(58) Field of Search .............................. 434/20–22, 11, 434/307 R

(56) References Cited

U.S. PATENT DOCUMENTS

| | | | |
|---|---|---|---|
| 4,352,665 A | * 10/1982 | Kimble et al. | 434/22 |
| 4,561,849 A | * 12/1985 | Eichweber | 434/22 |
| 4,801,201 A | * 1/1989 | Eichweber | 356/4 |
| 5,170,168 A | * 12/1992 | Roth | 342/45 |
| 5,741,185 A | * 4/1998 | Kwan et al. | 463/51 |
| 5,742,251 A | * 4/1998 | Gerber | 342/45 |
| 5,788,500 A | * 8/1998 | Gerber | 434/22 |
| 6,174,169 B1 | * 1/2001 | Gerber | 434/11 |

FOREIGN PATENT DOCUMENTS

| | | |
|---|---|---|
| DE | 28 46 962 B1 | 5/1980 |
| DE | 35 45 829 A1 | 8/1986 |
| EP | 0 254 197 A1 | 2/1988 |
| EP | 0 836 068 A1 | 4/1998 |
| EP | 0 836 069 A1 | 4/1998 |
| EP | 0 859 243 A1 | 8/1998 |

* cited by examiner

Primary Examiner—Joe H. Cheng
Assistant Examiner—Kathleen M. Christman
(74) Attorney, Agent, or Firm—Townsend and Townsend and Crew LLP; Guy W. Chambers

(57) ABSTRACT

The simulation system is used in the course of firing exercises, in particular with a laser beam, for simulating conditions which would arise if actual ammunition were used. For identifying a responder device (2), an interrogation device (1) transmits a coded radiation, which is detected in the responder device and is converted into electrical signals, which are supplied to a central unit (25) on the receiving end for transmitting identification messages back to the transmitting device in accordance with decisions made by this central unit (25). The interrogation device generates laser radiation or electromagnetic pulses or pulse bursts containing information which is coded in such a way that the response pulses being sent back by the responder device to the interrogation device additionally enable a central unit (15) on the transmitting end to calculate the distance between the interrogation device and the responder device.

17 Claims, 2 Drawing Sheets

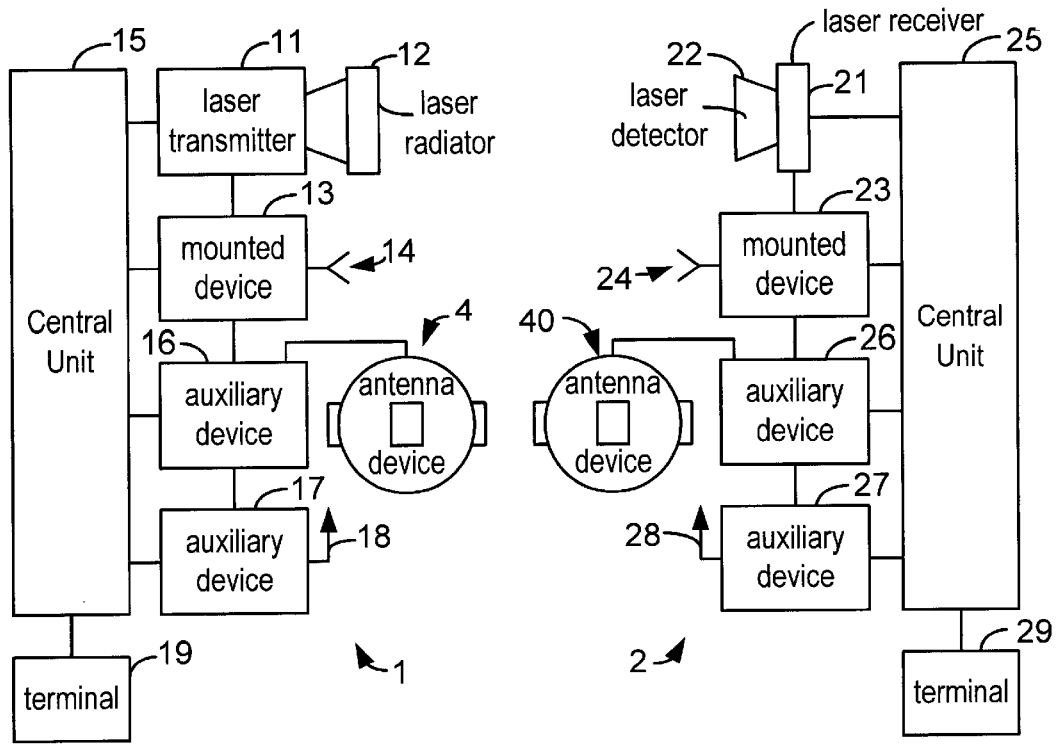
*FIG. 1.*  *FIG. 2.*
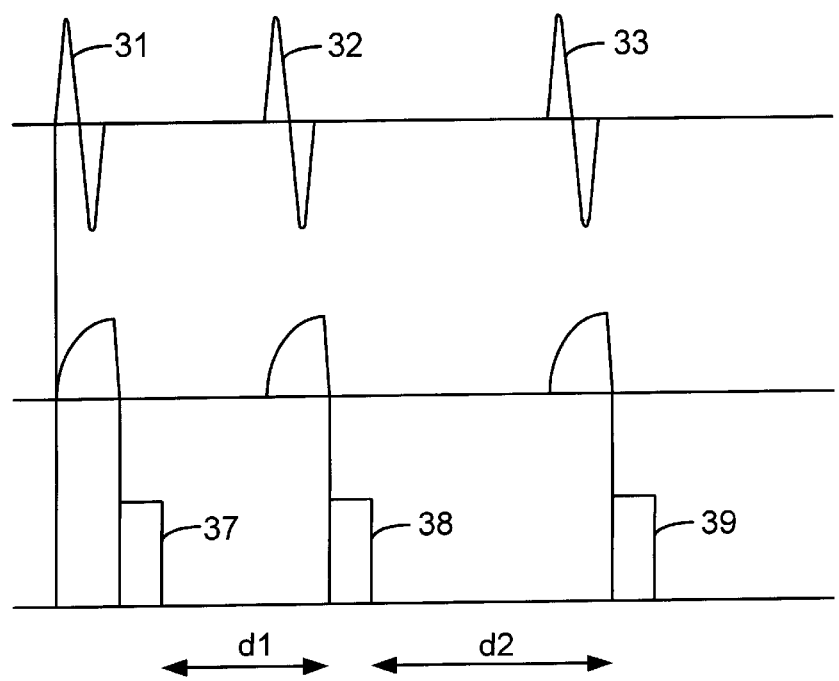
*FIG. 3.*

SIMULATION SYSTEM

FIELD OF THE INVENTION

The invention relates to a system with an interrogation device for identifying a responder device. The invention furthermore relates to a method for simulating firing, using an identification/simulation system.

BACKGROUND OF THE INVENTION

A laser identification/simulation system with a laser device for identifying a responder device is known from European Patent Application 97 120818.6 (Publication No. EP 0 859 243 A1). The interrogation system is designed for transmitting a coded laser beam, wherein the responder device has sensor means for detecting this laser beam and for converting it into electrical signals, which are passed on to an evaluation unit, as well as transmitting means for returning messages in accordance with decisions made in the evaluation unit to receiving means located inside or outside of the interrogation system. This laser device is designed to send a tight directional laser beam and contains chopping means for sending out a laser beam which is not only coded, but also chopped with a predetermined frequency. The sensor means of the responder device include means for obtaining an alternating electrical signal from the received chopped laser beam, which is supplied to a pre-amplifier, which is connected upstream of the discriminator.

Such a system is mounted on weapons which are normally carried by soldiers, wherein all participants in an exercise, both persons and objects, are equipped with detectors, which register a possible weapons effect on the participant. The functioning of such known systems, for example the so-called SIMLAS system, results from the technical characteristics of a friend-foe identification system (IFF), which can also be used in accordance with the present invention.

OBJECT AND SUMMARY OF THE INVENTION

It is now the object of the present invention to create a simulation system, which is not elaborate and permits dependable aiming, including a lead angle.

The simulation system is used in the course of firing exercises, in particular with a laser beam, for simulating conditions which would arise if actual ammunition were used. For identifying a responder device, an interrogation device transmits a coded radiation, which is detected in the responder device and is converted into electrical signals, which are supplied to a central unit on the receiving end for transmitting identification messages back to the transmitting device in accordance with decisions made by this central unit. The interrogation device generates laser radiation or electromagnetic pulses or pulse bursts containing information which is coded in such a way that the response pulses being sent back by the responder device to the interrogation device additionally enable a central unit on the transmitting end to calculate the distance between the interrogation device and the responder device.

Other advantageous embodiments of the invention ensue from the further dependent claims.

The invention will be explained in greater detail in what follows by means of drawings.

BRIEF DESCRIPTION OF THE DRAWINGS

FIG. 1 shows a schematic representation of a transmitting device in accordance with the invention, FIG. 2 shows a schematic representation of a receiving device in accordance with the invention.

FIG. 3 represents a diagram for explaining some information signals,

DETAILED DESCRIPTION OF THE PREFERRED EMBODIMENTS

Figure 4:
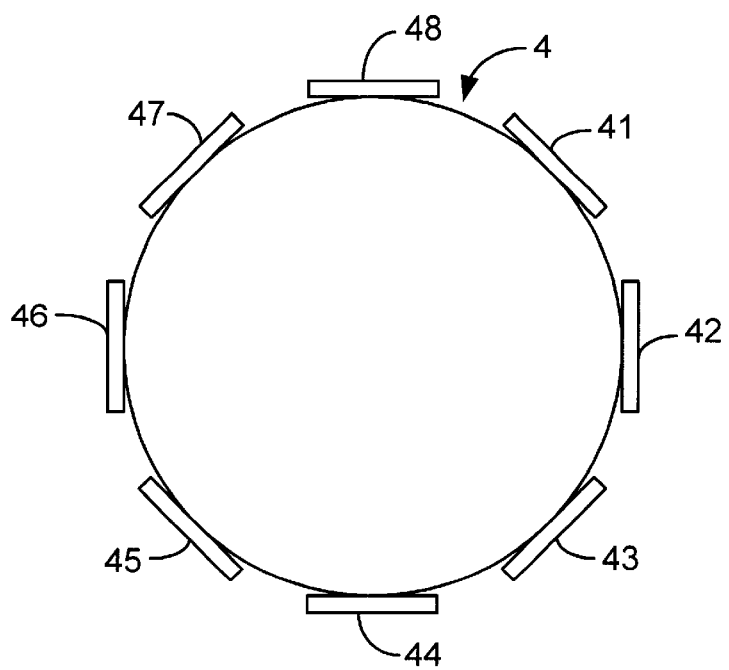
FIG. 4 shows an antenna device.

The interrogation device in accordance with FIG. 1 comprises a laser transmitter 11, which can be or is mounted on a weapon and which has a laser radiator 12, which can be integrated into the transmitter 11, a device 13, which can be or is mounted on this weapon or on another object of the same system and has an antenna 14, which can be integrated in the device 13, and a central unit 15. Respective auxiliary units 16 and 17 can be connected to the central unit 15. An antenna device 4, or respectively 18, is connected with the respective auxiliary devices 16 and 17. The device auxiliary 17 is preferably an RF system, and the antenna device 18 an RF antenna.

The responder device in accordance with FIG. 2 comprises a laser receiver 21 with at least one laser detector 22, which can be integrated into the laser receiver 21, a device 23 with an antenna 24, which can be integrated into the device 23, and a central unit 25. Two auxiliary devices 26 and 27 can be connected to the central unit 25. Respective antenna devices 40 or 28 are connected with the auxiliary devices 26 and 27. The auxillary device 27 is preferably an RF system and the antenna device 28 an RF antenna. At least one terminal 19, or respectively 29, can also be connected to the central units 15 and 25, which can be connected with a keyboard and/or a display and/or a headset and/or a microphone, for example.

Three pulses 31, 32, 33 in the range of picoseconds are represented by way of example in FIG. 3, which relates to the device 13 with the antenna 14. This corresponds to an oscillation frequency between 10 and 1000 GHz and a wavelength between 30 to 0.3 mm. The antenna 14 can have relatively small dimensions and can therefore be mounted on the weapon. Signals provided by a terminal 19 lead to the central unit 15 causing a modulation and/or coding of the control signals for the device 13, which operates as a transmitter, in such a way that the pulses 31, 32, 33 are triggered at different intervals, if desired. In the last case these pulses contain the information to be transmitted (for example a request to a responder device to identify itself). By means of a special embodiment and dimensioning of the antenna 14 it is possible to achieve the transmission of short, directed (directional) pulses 31, 32, 33.

The radiating characteristics of the transmitting device 13, 14 can be made directional to various degrees as desired by means of adapting, or respectively changing the antenna. It is possible to achieve an angle of the radiation lobe of approximately 30 mrad by means of a suitable antenna.

The antenna device 4 can be an omnidirectional antenna or can consist of a number, preferably between four and eight, flat-top antennas. FIG. 4 shows in what shape eight flat-top antennas 41 to 48, for example, can be peripherally arranged on a helmet, while an omnidirectional antenna can be advantageous for a tank or other larger installations.

Figure 5:
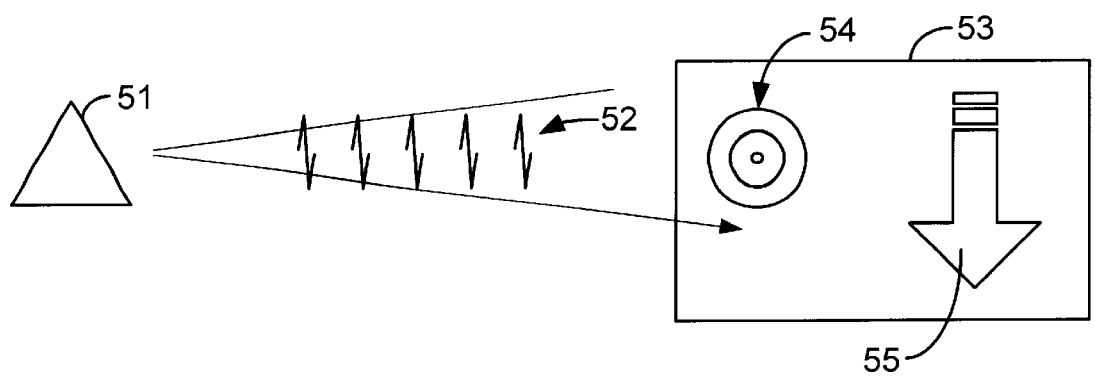
FIG. 5 represents a diagram for explaining the functioning of the simulation system in accordance with the invention.

FIG. 5 schematically represents a firing or transmitting device 51, which preferably transmits individual electromagnetic or laser pulses 52, and a responder device 53 with a target 54. The arrow 55 represents an indication of the relative movement, caused by gravity, of the actual munitions.

For carrying out the invention, neither the interrogating transmitting device 1 nor the responder device 2 need to have all the elements represented in FIGS. 1 and 2. Besides the central unit 15 and at least one terminal 19, only the elements 11, 12 or 13, 14 or 16, 4 or 17, 18, are required in the transmitting unit 1 for simulating purposes in accordance with the invention, or respectively in the responder device 2, besides the central unit 25 and at least one terminal 29, only the elements 21, 22 or 23, 24 or 26, 40 or 27, 28 are needed. The elements 11, 12 or 13, 14 in the transmitting device 1, or respectively the elements 21, 22 or 24, 23 in the responder device, can be used for aiming a weapon. The elements 17, 18, or respectively 27, 28, are provided in particular for identification.

The simulation system in accordance with the invention functions as follows:

Persons who are participating in an exercise, for example, can wear at least one of the detectors/sensors mentioned, preferably with the aid of a harness system in accordance with European Patent Applications EP 0 859 243 A1 and/or EP 0 836 068 A1 and/or EP 0 836 069 A1. Otherwise the subject of the present invention, which is also suitable for objects such as rifles, cannon, tanks, etc., can include all means recited in the patent applications in order to realize all functions known from these patent applications in the same or similar manner.

In accordance with a first embodiment of the invention, the pulses 31, 32, 33 (FIG. 3), which are chronologically modulated, are received by the device 23 with the antenna or the sensor 24, operating as a receiver, and are preferably also amplified in the responder device 2. From the received pulses 31, 32, 33 it is then possible to create information pulses 37, 38, 39, which can be longer than the pulses 31, 32, 33 or chronologically offset. The information, which was transmitted in code by means of the spacings d1, d2 between the pulses, is deciphered in the central unit 25 and is supplied in a suitable electrical form to at least one of the terminals 29. The receiving device 2, which thus operates as a responder device, can be designed for transmitting electromagnetic echo signals, for example via the auxiliary units 26 or 27 operating as a transmitter, which are received by the auxiliary devices 4, 16 or 18, 17, operating as receivers, of the interrogation device 1 in accordance with FIG. 1, in order to perform a distance measurement between the interrogation device 1 and the responder device 2. The chronologically modulated pulses are especially used for identification. It is possible to use pulses for the simulation, for example, which are not chronologically modulated. With the electromagnetic radiation from the antenna 14, the marksman does not aim directly at the target 54 (FIG. 4), but uses a lead factor, the same as if he were firing actual ammunition. He does pull the trigger, but the electromagnetic radiation is not initially started. First, all the short pulses are transmitted, which are received by the responder device 2 and are transmitted back to the interrogation device 1, where the distance and, if needed, the movements of the target are measured by means of these pulses. The electromagnetic radiation from the antenna 14 is triggered only after a delay time t and, if the marksman maintains the device actually in the previously calculated position, the electromagnetic radiation hits the sighted target exactly. The invention is based on the knowledge that the pulses are propagated faster to the target than actual ammunition travels between the weapon and the target. The central unit 15 can take the delay times into consideration by means of appropriate calculations. The delay time t can for example lie in the range between 100 and 150 msec.

In accordance with a second embodiment of the invention, a modulated laser pulse, for example in the range of 100 msec, is fired via the laser radiator 12 (FIG. 1). The modulated laser pulses are detected in the responder 2 by means of the laser device 21 with the antenna or the detector 22, operating as a laser receiver, and are converted into electrical signals. The information, which was transmitted in code, is deciphered in the central unit 25 and is supplied in a suitable electrical form to at least one of the terminals 29. The responder device can be embodied in such a way, that electromagnetic response signals are transmitted, for example via the auxiliary device 26 or 27 operating as a transmitter, which are received by the auxiliary devices 4, 16, or 18, 17, operating as receivers, of the interrogation device 1 in FIG. 1 in order to perform a distance measurement between the interrogation device 1 and the responder device 2. The modulated laser pulses are specifically used for identification. Laser pulses or electromagnetic pulses (for example RF) radiated via the antenna 14, or radio wave pulses radiated via the antenna 18, can be used for simulation, i.e. the measurement of the distance, or respectively of movement. With the laser beam from the optical laser device 12, the marksman does not aim directly at the target 54, but uses a lead factor, the same as if he were firing live ammunition. He does pull the trigger, but the electromagnetic radiation is not initially started. First, only the special pulses are transmitted, which are received by the responder device 2 and are transmitted back to the interrogation device 1, where the distance and, if needed, the movements of the target are measured by means of these pulses. As with the first embodiment, the laser beam is only triggered after a delay time.

Thus, a modulated laser pulse in the range of 100 msec is preferably fired. The marksman does not aim the laser directly at the target 54, but uses a lead factor, as if he were firing actual ammunition. No laser shot is fired when he pulls the trigger. Initially, the short pulses in the giga frequency range, for example between 10 and 1000 GHz, are transmitted, so that the distance and the movement can be measured by means of these. This information is transmitted back to the marksman by the responder device by means of the same short pulses and is electronically evaluated. The laser shot is fired after a predetermined time, for example 100 msec, so that the laser beam hits the target if the marksman is actually in the previously calculated position.

Flat-top antennas, for example, can be used as antennas 14 and 24, which can be fastened on a helmet. An antenna can for example be embodied in the shape of a trapezoid with a base of 20 to 40 mm, small sides of 5 to 15 mm, and a height of 30 to 50 mm. In place of individual pulses 31, 32, 33, it is also possible to transmit bursts of pulses, which are possibly damped and/or harmonic and/or inharmonic. The laser transmitter can be an 820 nm CW laser with an output in the range of 20 to 60 mW.

Thus, the system in accordance with the invention can also be employed in connection with a method wherein a modulated laser pulse is fired by a laser transmitter not directly on the responder device, but with a lead angle, as if actual ammunition were used, wherein initially no laser shot is fired when the trigger is pulled, but instead only short pulses at first, which are used to measure the distance and possibly also the movement, wherein this information is sent back by the target, also in the form of short pulses, to the laser transmitter and is electronically evaluated, and wherein the laser shot is fired after a predetermined amount of time so that, if the laser transmitter is actually in the precalculated position, the laser beam hits the target. In this case the short pulses used for simulating a shot can be laser pulses, or respectively laser pulses, or electromagnetic pulses, or individual pulses or pulse bursts.

The simulation system in accordance with the invention can also be used for simulating a shot with the aid of a transmitting device 1. Here, for identifying a responder device 2, a coded beam is transmitted, which is detected in the responder device and is converted to electrical signals, which are supplied to a central unit 25 on the receiving end for transmitting identification messages back to the transmitting device 1 in accordance with decisions made in this central unit 25, wherein the transmitting device 1 generates electromagnetic pulses or pulse bursts containing coded information in such a way that the response pulses which the responder device 2 transmits back to the sending device 1 on the basis of this information additionally enable a central unit 15 on the transmitting end to calculate from the response pulses the distance between the interrogation device and the responder device, and possibly also a movement of the responder device, in order to simulate from this the conditions which would result, if actual ammunition were used.

What is claimed is:

1. A shot simulation system comprising:

an interrogation device having a pulse transmitter for sending a pulse signal which can be used for distance measurement, a separate laser transmitter for sending a simulated shot and a processing unit;

a responder device having a sensor for sensing pulse signals received from said interrogation device, a laser detector for detecting a simulated shot from said interrogation device and a processing unit:

wherein at least one of said processing units uses said pulse signals to calculate the distance between said interrogation device and said responder device and then uses that distance calculation, in conjunction with said responder device's laser detector information, to determine whether said simulated shot would have resulted in hit.

2. The shot simulation system of claim 1 further comprising a receiver in said interrogation device and a transmitter in said responder device which allows said responder device to send distance and/or shot simulation information to said interrogation device.

3. The shot simulation system of claim 2 wherein distance and simulated shot calculations are made by said interrogation device processing unit using information received from said responder device.

4. The shot simulation system of claim 2 wherein the processing unit of said responder device formulates a response signal based upon the pulse signal received from said interrogation device.

5. The simulation system of claim 1 wherein said simulated shot will not result in a hit if the calculated distance between said interrogation device and said responder device is greater than a predetermined amount.

6. The simulation system of claim 1 wherein said pulse signal comprises radiation pulses.

7. The simulation system of claim 1 wherein said pulse signal and said simulated shot are transmitted approximately simultaneously from said interrogation device.

8. The simulation system of claim 2 wherein said interrogation device processing unit can use information received from said responder device to compute whether said responder device is moving.

9. The simulation system of claim 2 wherein said responder device can also send identification information about itself to said interrogation device.

10. The simulation system of claim 1 wherein one or more antennas are used for communicating information between said interrogation device and said responder device.

11. A method to determine whether a simulated shot results in a hit comprising the steps of:

transmitting to a responder device a pulse signal from an interrogation device pulse transmitter which can be used for distance measurement and a simulated shot from a seperate interrogation device laser transmitter;

receiving in said responder device both said pulse signal and, if said laser is aimed correctly, said simulated shot;

using said pulse signal to calculate the distance between said interrogation device and said responder device;

using said distance calculation and any correctly aimed simulated shot to determine whether said simulated shot results in a hit.

12. The method of claim 11 wherein said responder device uses said received pulse signal to send a return pulse signal back to said interrogation device and said distance calculation is done in said interrogation device.

13. The method of claim 11 wherein said interrogation device sends said pulse signal and said simulated shot approximately simultaneously.

14. The method of claim 11 wherein said simulated shot will not result in a hit if the calculated distance between said interrogation device and said responder device is greater than a predetermined amount.

15. The method of claim 11 wherein said pulse signal comprises radiation pulses.

16. The method of claim 12 wherein said interrogation device uses information received from said responder device to compute whether said responder device is moving.

17. The method of claim 12 wherein said responder device sends identification information about itself to the interrogation device.

\* \* \* \* \*